(12) United States Patent
Chen et al.

(10) Patent No.: US 11,946,562 B2
(45) Date of Patent: Apr. 2, 2024

(54) PILOT VALVE

(71) Applicant: ZHEJIANG DUNAN ARTIFICIAL ENVIRONMENT CO., LTD., Shaoxing (CN)

(72) Inventors: Jianjun Chen, Shaoxing (CN); Haibo Liu, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 17 days.

(21) Appl. No.: 17/624,167

(22) PCT Filed: Sep. 4, 2020

(86) PCT No.: PCT/CN2020/113437
§ 371 (c)(1),
(2) Date: Dec. 30, 2021

(87) PCT Pub. No.: WO2021/077918
PCT Pub. Date: Apr. 29, 2021

(65) Prior Publication Data
US 2022/0356960 A1 Nov. 10, 2022

(30) Foreign Application Priority Data
Oct. 21, 2019 (CN) .......................... 201921764030.4

(51) Int. Cl.
*F16K 31/06* (2006.01)
*F16K 27/04* (2006.01)
*F16K 31/40* (2006.01)

(52) U.S. Cl.
CPC ............ *F16K 31/40* (2013.01); *F16K 27/048* (2013.01); *F16K 31/0675* (2013.01); *F16K 31/0617* (2013.01)

(58) Field of Classification Search
CPC .... F16K 27/048; F16K 31/06; F16K 31/0675; F16K 31/0617
See application file for complete search history.

(56) References Cited

U.S. PATENT DOCUMENTS

| 9,163,744 | B2 * | 10/2015 | Fukano | ................... H01F 7/128 |
| 10,927,974 | B2 * | 2/2021 | Lentz | .................... F16K 27/029 |
| 2005/0061302 | A1 * | 3/2005 | Tatsu | .................. F16K 31/0651 |
| | | | | 251/129.22 |

(Continued)

FOREIGN PATENT DOCUMENTS

| CN | 1916466 A | 2/2007 |
| CN | 101196251 A | 6/2008 |

(Continued)

OTHER PUBLICATIONS

International Search Report of PCT/CN2020/113437.

*Primary Examiner* — Matthew W Jellett

(57) ABSTRACT

A pilot valve is provided, which comprises a valve body having a cylindrical structure, a magnetically permeable sleeve made of permeability magnetic material, and a coil assembly. The magnetically permeable sleeve is sleeved and fixed on one end of the valve body. The coil assembly is sleeved on the magnetically permeable sleeve. The coil assembly comprises an electromagnetic coil wound along the circumference of the magnetically permeable sleeve.

8 Claims, 3 Drawing Sheets

(56) References Cited

U.S. PATENT DOCUMENTS

2020/0408319 A1* 12/2020 Chen .................... F16K 27/048

FOREIGN PATENT DOCUMENTS

| | | |
|---|---|---|
| CN | 201237005 Y | 5/2009 |
| CN | 101709806 A | 5/2010 |
| CN | 202017812 U | 10/2011 |
| CN | 202031901 U | 11/2011 |
| CN | 102537482 A | 7/2012 |
| CN | 203335992 U | 12/2013 |
| EP | 1544525 B1 | 5/2006 |

* cited by examiner

PILOT VALVE

CROSS-REFERENCE TO RELATED APPLICATIONS

This application is a National Stage application of international application No. PCT/CN2020/113437 filed on Sep. 4, 2020, which claims all benefits accruing under 35 U.S.C. § 119 from China Patent Application No. 201921764030.4, filed on Oct. 21, 2019, and titled "PILOT VALVE" in the China National Intellectual Property Administration, the content of which is hereby incorporated by reference.

TECHNICAL FIELD

The present disclosure relates to the field of electromagnetic valve, in particular, to a pilot valve.

BACKGROUND

As an electromagnetically controlled industrial device, a pilot valve is a basic automatic component used to control a flow rate of a fluid. Currently, the pilot valve is at an opened or closed state by either an electromagnet or a resetting spring. When the pilot valve is in the opened state, a high current to the electromagnetic coil is necessary to overcome the fluid pressure and the spring pretightening force, and maintain a low current after opening until the valve core is closed. The electromagnetic coil is prone to heat generation after energized for a long time. If the temperature of the electromagnetic coil is too high, it will affect the working performance of the pilot valve, making operational reliability of the pilot valve low.

SUMMARY

On the basis of embodiments of the present disclosure, a pilot valve is provided, which includes a valve body having a cylindrical structure, a concentrating flux sleeve made of permeability magnetic material, wherein the concentrating flux sleeve has a hollow structure, and is sleeved on and fixed to a first end of the valve body, and a coil assembly sleeved on the concentrating flux sleeve, wherein the coil assembly includes an electromagnetic coil wound along a circumference of the concentrating flux sleeve.

In some embodiments, the valve body includes a valve sleeve having a hollow cylindrical structure and a valve core accommodated and fixed in the valve sleeve. The concentrating flux sleeve is sleeved on the valve sleeve and fixed to a first end of the valve sleeve, and the outer wall at a second end away from the concentrating flux sleeve of the valve sleeve is provided with an inlet and an outlet that is capable of communicating with the inlet. The valve core is capable of sliding along a longitudinal direction of the valve sleeve to open or close the outlet In some embodiments, the valve sleeve includes a conduit and a pedestal. The conduit is a pipe-shaped structure with a mounting opening at the first end thereof, the inlet is located on a second end away from a first end of the conduit. The outlet is located on a side wall of the conduit and away from the mounting opening. The pedestal is hermetically fixed to the first end of the conduit having the mounting opening, and the concentrating flux sleeve is sleeved on the conduit and fixed to the first end of the conduit having the mounting opening.

In some embodiments, the valve body further includes an elastic resetting member. The elastic resetting is accommodated and mounted in the valve sleeve, and is configured to provide an elastic force along a direction from the concentrating flux sleeve to the outlet for the valve core.

In some embodiments, the outer wall at the first end of the valve sleeve is provided with a mounting groove, and the mounting groove is disposed on an edge of the outer wall of the valve sleeve along a circumference of the valve sleeve, and the concentrating flux sleeve is sleeved and fixed in the mounting groove.

In some embodiments, a projection of the electromagnetic coil on an outer surface of the concentrating flux sleeve is within the outer surface of the concentrating flux sleeve.

In some embodiments, the concentrating flux sleeve is a hollow tube-shaped structure with two openings at both ends.

In some embodiments, the concentrating flux sleeve is a hollow structure with two opening at both ends, and an edge at an end of the concentrating flux sleeve bends inwards to form a mounting plate in an annular shape. The mounting plate abuts against the first end of the valve body.

In some embodiments, the mounting plate is provided with a mounting hole, and an end surface of the first end of the valve body is provided with a connecting hole corresponding to the mounting hole. The pilot valve further includes a connecting member, wherein the connecting member penetrates pivotally through the mounting hole and is fixed in the connecting hole.

In some embodiments, the coil assembly further includes a coil skeleton disposed along the circumference of the concentrating flux sleeve. The coil skeleton is sleeved on and fixed to an outer wall of the concentrating flux sleeve, and the electromagnetic coil is wound on the coil skeleton along the circumference of the concentrating flux sleeve.

In the present disclosure, when the pilot valve is working, an electromagnetic coil is powered, and a magnetic field is generated in a valve body, so that the pilot valve is opened under the action of the magnetic field generated by the electromagnetic coil. Since the concentrating flux sleeve is made of a permeability magnetic material, a concentrating flux sleeve disposed between a coil assembly and the valve body can gather the magnetic field generated by the electromagnetic coil, so as to increase an adsorption capacity of the electromagnetic coil and decrease current on the electromagnetic coil. Thus, power is decreased and temperature rise of the electromagnetic coil is less. Therefore, when the pilot valve works, a working temperature of the electromagnetic coil will not be very high even the electromagnetic coil is powered for a long time. Operational reliability of the pilot valve is greatly improved.

BRIEF DESCRIPTION OF THE DRAWINGS

In order to better describe and explain the embodiments and/or examples of those inventions disclosed herein, one or more drawings may be referred to. The additional details or examples used to describe the drawings should not be considered as limiting the scope of any of the disclosed inventions, the currently described embodiments and/or examples, and the best mode of these inventions currently understood.

DETAILED DESCRIPTION

In order to facilitate the understanding of the present disclosure, the present disclosure will be described in a more comprehensive manner with reference to the relevant drawings. A preferred embodiment of the present disclosure is shown in the accompanying drawings. However, the present disclosure can be implemented in many different forms and is not limited to the embodiments described herein. On the contrary, the purpose of providing these examples is to make the understanding of the disclosure of the present disclosure more thorough and comprehensive.

It should be noted that when an element is referred to as being "fixed" to another element, it may be directly attached to the other element or a further element may be presented between them. When an element is considered to be "connected" to another element, it may be directly connected to the other element or connected to the other element through a further element (e.g., indirectly connected). The terms as used herein "vertical", "horizontal", "left", "right", and the like, are for illustrative purposes only and are not meant to be the only orientation.

Unless otherwise defined, all technical and scientific terms used herein have the same meaning as a skilled person in the art would understand. The terminology used in the description of the present disclosure is for the purpose of describing particular embodiments and is not intended to limit the disclosure. The term "and/or" as used herein includes any and all combinations of one or more related listed items.

Figure 1:
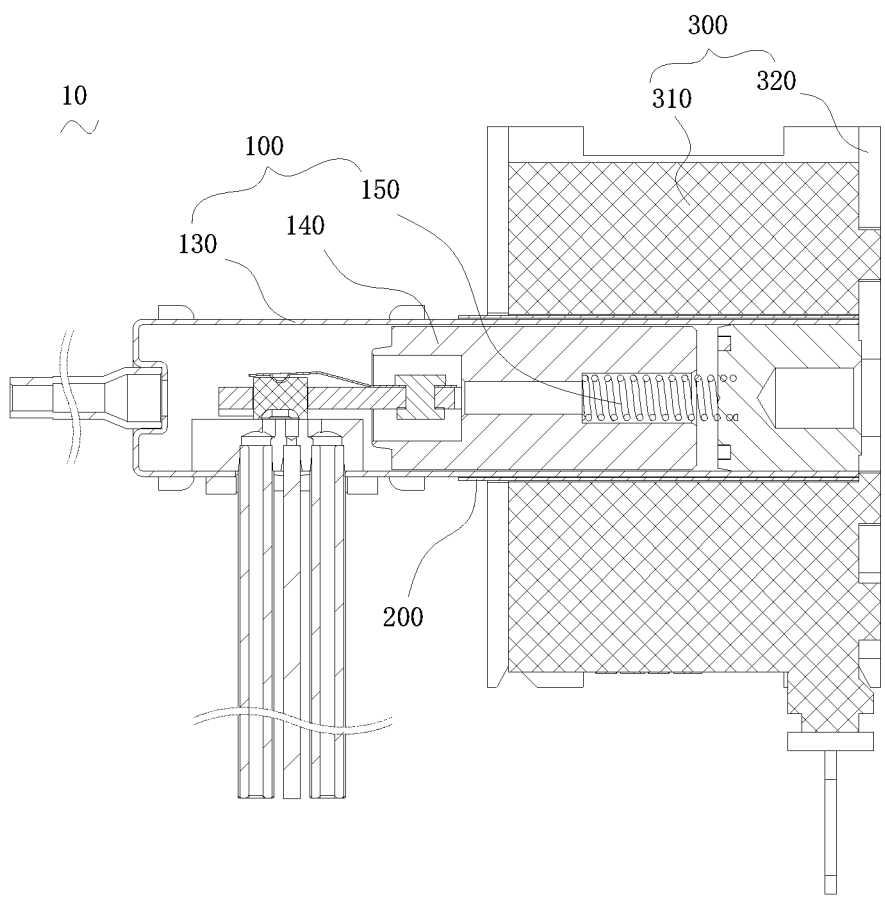
FIG. 1 is a structural schematic diagram of a pilot valve in a preferred embodiment of the present disclosure.

Referring to FIG. 1, in a preferred embodiment of the present disclosure, a pilot valve 10 can include a valve body 100, a concentrating flux sleeve 200 and a coil assembly 300.

Figure 2:
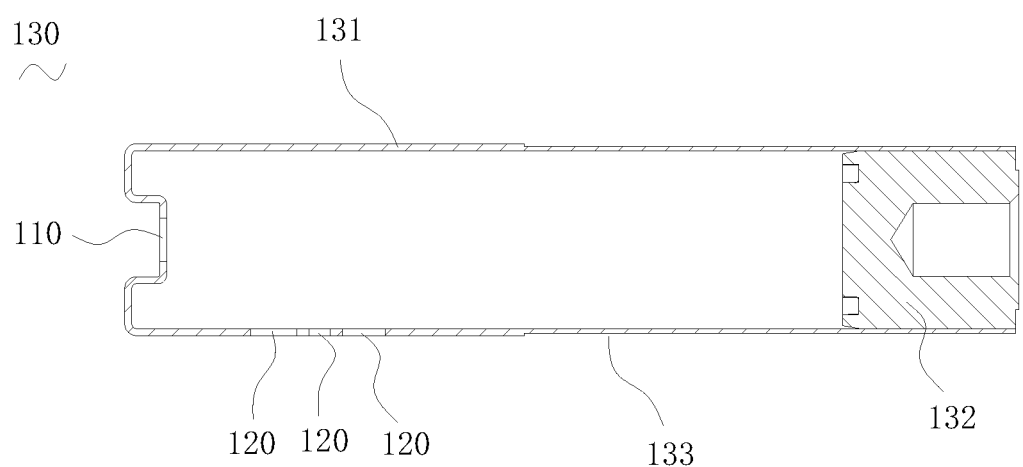
FIG. 2 is a structural schematic diagram of a valve sleeve of the pilot valve in FIG. 1.

Referring to FIG. 2, the valve body 100 can have a cylindrical structure. The valve body 100 can include an inlet 110 and an outlet 120 that can communicate with the inlet 110. A fluid from the outside can flow into the valve body 100 through the inlet 110, and a fluid inside the valve body 100 can flow to the outside of through the outlet 120. In actual use, when the pilot valve 10 is in an open state, the outlet 120 can be opened and in communication with the inlet; and when the pilot valve 10 is in a closed state, the outlet 120 can be closed, and not be in communication with the inlet 110.

Referring to FIG. 1, in the present embodiment, the valve body 100 can include a valve sleeve 130 having a hollow cylindrical structure and a valve core 140 accommodated and fixed in the valve sleeve 130. The valve sleeve 130 can mainly play a role of supporting, and can be commonly made of materials having a relatively large strength such as stainless steel, alloy steel, and the like. An outer wall of the valve sleeve 130 can be provided with the inlet 110 and the outlet 120 communicating with the inlet 110. The valve core 140 can be slidable along a longitudinal direction of the valve sleeve 130 to open or close the outlet 120. That is, the valve core 140 slides inside the valve sleeve to open or close the pilot valve 10.

Furthermore, in the present embodiment, the valve body can include a plurality of outlets 120. The plurality of outlets 120 can be successively disposed at intervals along the longitudinal direction of the valve sleeve 130. In actual use, a number of the opened outlets 120 can be controlled by controlling a displacement distance of the valve core 140, so as to control a flow rate of the fluid. In some embodiments, the number of the outlet 120 can be three, and the pilot valve 10 can be a four-way valve.

Furthermore, in the present embodiment, the valve sleeve 130 can be a stainless steel sleeve. Stainless steel not only has relatively high strength, but also has good anti-corrosion capacity. Therefore, using the stainless steel to make the valve sleeve 130 not only can decrease probability of damage such as cracking and the like while using the valve sleeve 130, but also can decrease probability of corrosion of the valve sleeve 130 after being in contact with the fluid for a long time. Therefore, the valve sleeve 130 can have a longer service life, thereby effectively prolonging a service life of the pilot valve 10.

Figure 3:
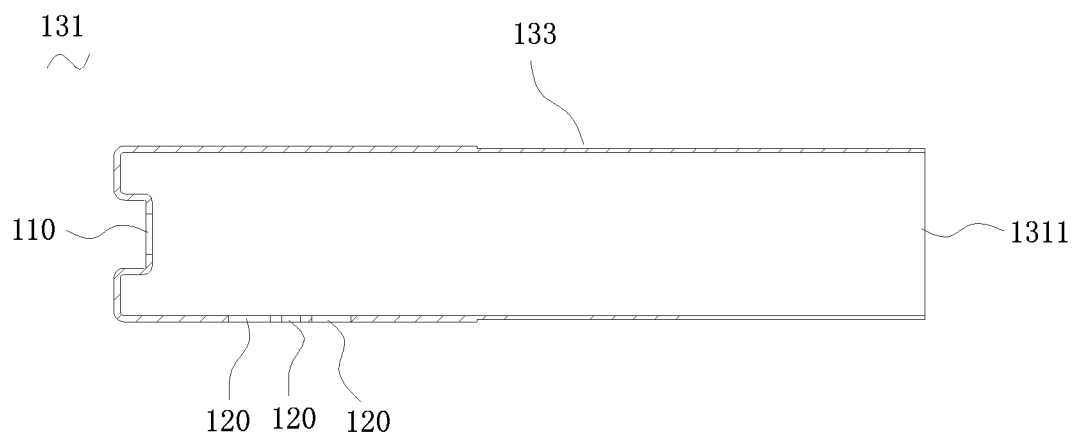
FIG. 3 is a structural schematic diagram of a conduit of the valve sleeve in FIG. 2.

Referring to FIG. 3, furthermore, in the present embodiment, the valve sleeve 130 can include a conduit 131 and a pedestal 132. The conduit 131 can be a pipe-shaped structure provided with the inlet 110 and a mounting opening 1311 at both ends, respectively. A second end of the conduit 131 away from the mounting opening 1311 can be provided with the outlet 120 that can communicate with the inlet 110. The pedestal 132 can be hermetically fixed to a first end of the conduit 131 having the mounting opening 1311. In actual production, components such as valve core 140 and the like can be firstly mounted in the conduit 141, and then the pedestal 132 can be hermetically fixed to the first end of the conduit 141 having the mounting opening 1311. Thus, the valve sleeve 130 composed of the conduit 131 and the pedestal 132 can make mounting of the pilot valve 10 easier. In some embodiments, the pedestal 132 can be detachably fixed to the first end of the conduit 131 having the mounting opening 1311, which can facilitate mending of the pilot valve 10.

The concentrating flux sleeve 200 can be made of the permeability magnetic material. Therefore, the concentrating flux sleeve 200 can have relatively high magnetically permeability. The concentrating flux sleeve 200 can be generally made of materials having relatively good magnetically permeability such as a cold rolled steel (such as ST12, DC01, SPCC, and the like), an alloy steel (such as Cr12 and the like) and the like. The concentrating flux sleeve 200 can have a hollow structure. The concentrating flux sleeve 200 can be sleeved on and fixed to a second end of the valve body 100. The concentrating flux sleeve 200 can be fixed to the valve body 100 by means of welding, threaded connection, and the like. In some embodiments, the concentrating flux sleeve 200 can be sleeved on the valve sleeve 130 and fixed to a second end of the valve sleeve 130.

Referring to FIG. 1 to FIG. 3, in the present embodiment, the outer wall at the first end of the valve sleeve 130 can be provided with a mounting groove 133. The mounting groove 133 can be disposed on an edge of the outer wall of the valve sleeve 130 along circumference of the valve sleeve 130. The concentrating flux sleeve 200 can be sleeved and fixed in the mounting groove 133. Therefore, while mounting the concentrating flux sleeve 200, the concentrating flux sleeve 200 can be merely sleeved and fixed in the mounting groove 133, omitting an axial capturing process of the concentrating flux sleeve 200 and the valve sleeve 130. Therefore, a mounting process of the concentrating flux sleeve 200 can be greatly simplified. In addition, the mounting groove 133 can limit the concentrating flux sleeve 200 along an axial direction of the valve body 100, which can prevent the concentrating flux sleeve 200 and the valve sleeve 130 from sliding towards the outlet 120 while fixing. This can further simplify the mounting process of the concentrating flux sleeve 200.

Referring to FIG. 1 to FIG. 3, in the present embodiment, the coil assembly 300 can be sleeved on the concentrating flux sleeve 200. The coil assembly 300 can include an electromagnetic coil 310 wound along a circumference of the concentrating flux sleeve 200. When the pilot valve 10 is required to in an opened state, the electromagnetic coil 310 should be firstly powered on. At this time, a magnetic field can be generated by the electrified electromagnetic coil 310 in the valve body 100, and the valve core 140 can move along a longitudinal direction of the valve sleeve 130 under the action of the magnetic field generated by the electromagnetic coil 310, so as to open or close the outlet 120. In some embodiments, as long as a current direction on the electromagnetic coil 310 is changed, displacement direction of the valve core 140 in the valve sleeve 130 can be changed, so that the pilot valve 10 can be switched between an open state and a close state.

Since the concentrating flux sleeve 200 is made of the permeability magnetic materials having a relatively good magnetically permeable, the concentrating flux sleeve 200 disposed between the coil assembly 300 and the valve body 100 can gather the magnetic field generated by the electromagnetic coil 310. Therefore, the adsorption capability of the electromagnetic coil 310 can be increased, and a current on the electromagnetic coil 310 can be decreased. Thus, the power is lowered, and temperature rise of the electromagnetic coil is less. Therefore, when the pilot valve 10 works, a working temperature of the electromagnetic coil 310 will not be very high even the electromagnetic coil 310 is powered for a long time. Operational reliability of the pilot valve 10 can be largely improved.

Referring to FIG. 1, in the present embodiment, the valve body 100 can further include an elastic resetting member 150. The elastic resetting member 150 can be a spring, a rubber cushion or the like. In the present embodiment, the elastic resetting member 150 can be a spring. The elastic resetting member 150 can be accommodated and fixed in the valve sleeve 130, and provide an elastic force along a direction from the concentrating flux sleeve 200 to the outlet 120 for the valve core 140. In some embodiments, the elastic resetting member 150 can be disposed between the pedestal 132 and the valve core 140.

When the pilot valve 10 is required to be in the opened state, the electromagnetic coil 310 is firstly powered on, so that the valve core 140 can slide along a direction from the out let 120 to the concentrating flux sleeve 200 under the action of the magnetic field generated by the electromagnetic coil 310 until the outlet 120 is opened. Thus, the inlet 110 can communicate with the outlet 120 and the pilot valve 10 can be opened. At this time the elastic member 150 can be in a compression state.

When the pilot valve 10 is required to be in the closed state, power supply of the electromagnetic coil 310 is cut off. At this time, the valve core 140 can slide along a direction from the concentrating flux sleeve 200 to the outlet 120 under the action of the elastic force provided by the resetting member 150 until the outlet 120 is closed. Thus, the communication between inlet 110 and the outlet 120 can be cut off, and the pilot valve 10 can be closed.

Therefore, by using the elastic resetting member 150, the pilot valve 10 can be closed without energizing the electromagnetic coil 10. This can largely decrease energy consumption of the pilot valve 10.

In the present embodiment, both a radial cross section of the concentrating flux sleeve 200 and a radial cross section of the valve sleeve 130 can be circle shaped. By designing the radial cross section of the valve sleeve 130 as circle shaped, an inner wall of the valve sleeve 130 can be smoother. This not only can make operation of the pilot valve 10 more easily, but also can effectively decrease a resistance the fluid suffering from in the valve sleeve 130, so that running accuracy of the pilot valve 10 can be higher. Designing the radial cross section of the concentrating flux sleeve 200 as circle shaped not only can effectively increase a contacting area between the concentrating flux sleeve 200 and the valve sleeve 110 to improve a fixing performance between the concentrating flux sleeve 200 and the valve sleeve 130, but also can facilitate gathering of the magnetic field generated by the electromagnetic coil 310.

Referring to FIG. 1, in the present disclosure, a projection of the electromagnetic coil 310 on an outer surface of the concentrating flux sleeve 200 can be within the outer surface of the concentrating flux sleeve 200. Thus, the concentrating flux sleeve 200 can provide more uniform adsorption capacity for the electrified electromagnetic coil 310, thereby making aggregation effect of the magnetic field generated by the electromagnetic coil 310 better, and further decreasing temperature rise of the electromagnetic coil 310. Therefore, the projection of the electromagnetic coil 310 on the outer surface of the concentrating flux sleeve 200 falling within the outer surface of the concentrating flux sleeve 200 can further improve operational reliability of the pilot valve 10.

Figure 4:
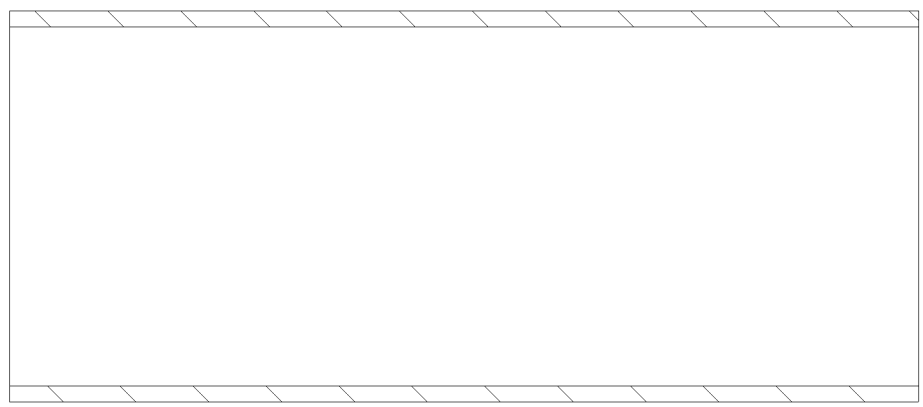
FIG. 4 is a structural schematic diagram of a concentrating flux sleeve in an embodiment of the present disclosure.

Referring to FIG. 4, in some embodiments, the concentrating flux sleeve 200 can have a hollow tube-shaped structure provided with two openings at both ends. Therefore, the concentrating flux sleeve 200 can be mounted by merely sleeving the concentrating flux sleeve 200 on a first end of the valve body 100 and fixed to the valve body 100 by methods such as welding and the like. In some embodiments, the concentrating flux sleeve 200 can be fixed to the valve body 100 by welding. That is, by designing the concentrating flux sleeve 200 as a tube-shaped structure having two openings at both ends, a structure of the concentrating flux sleeve is simple and easy to be processed. This can effectively simplify the structure of the pilot valve 10.

Figure 5:
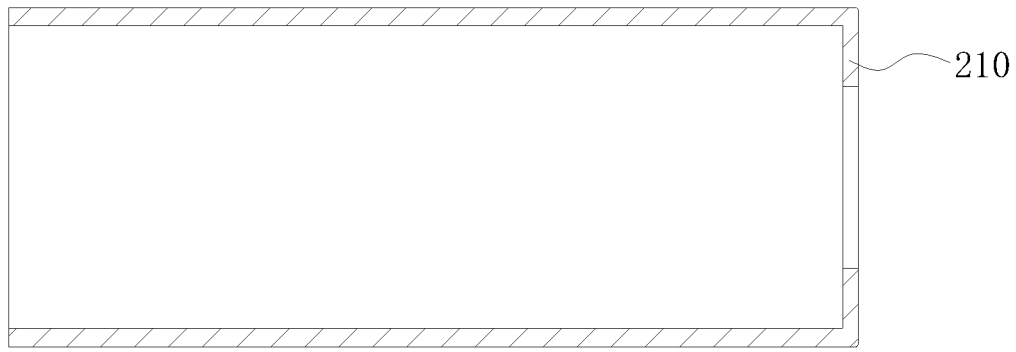
FIG. 5 is a structural schematic diagram of a concentrating flux sleeve in another embodiment of the present disclosure.

Referring to FIG. 5, in some embodiments, the concentrating flux sleeve 200 can be a hollow structure with two openings at both ends. An edge at an end of the concentrating flux sleeve 200 can bend inwards to form a mounting plate 210 in an annular shape. The mounting plate 210 can abut against the first end of the valve body 10. Therefore, when mounting the concentrating flux sleeve 20, the mounting plate 210 can abut against the first end of the valve body 100 to radially limit the concentrating flux sleeve 200, thereby facilitating fixing the concentrating flux sleeve 200. In some embodiments, the mounting plate 210 can be fixed to a first end of the valve body 100. Mounting the concentrating flux sleeve 200 on the valve sleeve 100 can be merely sleeving the hollow structure on the first end of the valve body 100 and fixing the mounting plate 210 to the first end of the valve body 100. Thus, it is more convenient to mount the concentrating flux sleeve 200.

Furthermore, in the present embodiment, the mounting plate 210 can be provided with a mounting hole 211. An end surface of the first end of the valve body 100 can be provided with a connecting hole 160 corresponding to the mounting hole 211. The pilot valve 10 can further include a connecting member (not shown in the figures), wherein the connecting member can pivotally penetrate through the mounting hole 211 and be fixed in the connecting hole 160. When mounting the concentrating flux sleeve 200, the concentrating flux sleeve 200 can be mounted and fixed to the valve body 100 by the following steps: sleeving the concentrating flux sleeve 200 on the first end of the valve body 100; penetrating and fixing the connecting member through the mounting hole 211 along the axial direction of the valve body 10; and, inserting the connecting member into a first end of the concentrating flux sleeve 200 and fixed to the connecting hole 160. That is, by designing the connecting member, it is more convenient to mount the concentrating flux sleeve 200.

In some embodiments, the fastening connecting member can be a threaded fastener, and the connecting hole 160 is a threaded hole. The threaded fastener can penetrate through the mounting hole 211 and threadably connect with the threaded hole. Therefore, the concentrating flux sleeve 200 can be detachably connected with the valve body 100, making it more convenient to mount and dismount the concentrating flux sleeve 200. Therefore, in actual use, although occasions such as damage of the concentrating flux sleeve 200 occur, the concentrating flux sleeve 200 can be changed. This can effectively prolong the service life of the pilot valve 10.

It should be noted that the concentrating flux sleeve 200 can be fixed by the following methods: firstly, fixing the mounting plate 210 to the first end of the valve body 10 with the connecting member, which can make mounting of the concentrating flux sleeve 200 more convenient; secondly, fixing the valve body 100 to the concentrating flux sleeve 200 by welding, which can improve fixing effect between the concentrating flux sleeve 200 and the valve body 100; and thirdly, fixing the mounting plate 210 to the first end of the valve body 100 with the connecting member, and then fixing the concentrating flux sleeve to the valve body 100 by welding, which can further improve the fixing effect of the concentrating flux sleeve 200.

Referring to FIG. 1, in the present embodiment, the coil assembly 300 can further include a coil skeleton 320 disposed along the circumference of the concentrating flux sleeve 200. The coil skeleton 320 can be sleeved on the concentrating flux sleeve 200 and fixed to an outer wall of the concentrating flux sleeve 200. The electromagnetic coil 310 can be wound on the coil skeleton 320 along the circumference of the concentrating flux sleeve 200. During processing of the pilot valve 10, the electromagnetic coil 310 can be firstly wound on the coil skeleton 320 to form the coil assembly 300, and then the coil skeleton 320 can be sleeved and fixed on the outer wall of the concentrating flux sleeve 200. Thus mounting of the coil assembly 300 can be completed. That is, the coil skeleton 320 can be mainly used for mounting the electromagnetic coil 310, and can make it more convenient to mount the electromagnetic coil 310 on the valve body 100.

In the present disclosure, when the pilot valve 10 is used, an electromagnetic coil 310 is electrified, and a magnetic field can be generated in a valve body 100, so that the pilot valve 10 can be opened under the action of the magnetic field generated by the electromagnetic coil 310. Since the concentrating flux sleeve 200 is made of a permeability magnetic material, a concentrating flux sleeve 200 disposed between a coil assembly 300 and the valve body 100 can gather the magnetic field generated by the electromagnetic coil 310, so as to increase an adsorption capacity of the electromagnetic coil 310 and decrease current on the electromagnetic coil 310. Thus, power is decreased and temperature rise of the electromagnetic coil 310 can be lower. Therefore, when the pilot valve 10 works, a working temperature of the electromagnetic coil 310 will not be very high even the electromagnetic coil 310 is powered for a long time. Operational reliability of the pilot valve 10 can be largely improved.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. A pilot valve, comprising
a valve body having a cylindrical structure,
a concentrating flux sleeve made of permeability magnetic material wherein the concentrating flux sleeve has a hollow structure, and the concentrating flux sleeve is sleeved on and fixed to a first end of the valve body; and
a coil assembly sleeved on the concentrating flux sleeve, wherein the coil assembly comprises an electromagnetic coil wound along a circumference of the concentrating flux sleeve,
wherein the valve body comprises a valve sleeve having a hollow cylindrical structure and a valve core accommodated and fixed in the valve sleeve, the concentrating flux sleeve is sleeved on the valve sleeve and fixed to a first end of the valve sleeve,
a side wall at the first end of the valve sleeve is provided with a mounting groove, and the mounting groove is disposed on an edge of the side wall of the valve sleeve along a circumference of the valve sleeve, and the concentrating flux sleeve is sleeved on and fixed in the mounting groove, and
the concentrating flux sleeve extends from an end of the electromagnetic coil to another end of the electromagnetic coil along an axis of the electromagnetic coil.

2. The pilot valve of claim 1, wherein a side wall at a second end of the valve sleeve away from the concentrating flux sleeve is provided with an inlet and an outlet that is capable of communicating with the inlet,
the valve core is capable of sliding along a longitudinal direction of the valve sleeve to open or close the outlet.

3. The pilot valve of claim 2, wherein the valve sleeve comprises a conduit and a pedestal,
the conduit is a pipe-shaped structure comprises a first end of the conduit and a second end of the conduit, the first end of the conduit is provided with a mounting opening and the second end of the conduit away from the first end of the conduit is provided with the inlet,
the outlet is located on a side wall of the conduit and away from the mounting opening,
the pedestal is hermetically fixed to the first end of the conduit having the mounting opening, and the concentrating flux sleeve is sleeved on the conduit and fixed to the first end of the conduit having the mounting opening.

4. The pilot valve of claim 2, wherein the valve body further comprises an elastic resetting member, the elastic resetting member is accommodated and mounted in the valve sleeve, and is configured to provide an elastic force along a direction from the concentrating flux sleeve to the outlet for the valve core.

5. The pilot valve of claim 1, wherein the concentrating flux sleeve is a hollow tube-shaped structure with two openings at both ends of the concentrating flux.

6. The pilot valve of claim 1, wherein the concentrating flux sleeve is a hollow structure with two openings at both ends, and an edge at an end of the concentrating flux sleeve bends inwards to form a mounting plate in an annular shape, and the mounting plate abuts against the first end of the valve body.

7. The pilot valve of claim 6, wherein the mounting plate is provided with a mounting hole, and an end surface of the first end of the valve body is provided with a connecting hole corresponding to the mounting hole, the pilot valve further comprises a connecting member, wherein the connecting member penetrates pivotally through the mounting hole and is fixed in the connecting hole.

8. The pilot valve of claim 1, wherein the coil assembly further comprises a coil skeleton disposed along the circumference of the concentrating flux sleeve, the coil skeleton is sleeved on and fixed to a side wall of the concentrating flux sleeve, and the electromagnetic coil is wound on the coil skeleton along the circumference of the concentrating flux sleeve.

* * * * *